United States Patent [19]
Montino et al.

[11] Patent Number: 5,221,657
[45] Date of Patent: Jun. 22, 1993

[54] PROCESS FOR PRODUCING THE PRECURSOR OF A PRECIPITATED CATALYST FOR THE AMMONIA SYNTHESIS

[75] Inventors: Franco Montino, Novara; Luigi Balducci, Pavia; Francesco Ferrero; Nicola Pernicone, both of Novara, all of Italy

[73] Assignee: Ministero Dell'Universita' E Della Ricerca Scientifica E Tecnologica, Rome, Italy

[21] Appl. No.: 707,049

[22] Filed: May 29, 1991

[30] Foreign Application Priority Data

May 29, 1990 [IT] Italy ................................. 20455 A/90

[51] Int. Cl.$^5$ ..................... B01J 23/78; B01J 37/03; B01J 21/04; B01J 23/04
[52] U.S. Cl. ................................................ 502/330
[58] Field of Search ......................................... 502/330

[56] References Cited

U.S. PATENT DOCUMENTS

| | | | |
|---|---|---|---|
| 3,746,658 | 7/1973 | Porta et al. ..................... | 502/219 |
| 3,755,294 | 8/1973 | Walon ............................ | 502/330 X |
| 4,499,204 | 2/1985 | Vanderspurt et al. ......... | 502/330 X |
| 4,668,658 | 5/1987 | Jennings ........................ | 502/338 |
| 4,689,317 | 8/1987 | Jennings ........................ | 502/330 |

FOREIGN PATENT DOCUMENTS

| | | |
|---|---|---|
| 0200315 | 12/1986 | European Pat. Off. . |
| 0224947 | 6/1987 | European Pat. Off. . |
| 0325214 | 7/1989 | European Pat. Off. . |
| 0598632 | 3/1978 | U.S.S.R. .................... 502/330 |

*Primary Examiner*—W. J. Shine
*Assistant Examiner*—Douglas J. McGinty
*Attorney, Agent, or Firm*—Oblon, Spivak, McClelland, Maier & Neustadt

[57] ABSTRACT

A process for producing the precursor of a precipitated catalyst for the $NH_3$ synthesis, based on Fe, Al, Co and K oxides, which comprises the steps of:

(A) preparing an aqueous solution of water-soluble compounds of Fe, Al and Co—adding iron as a water-soluble ferrous salt of an organic acid—and causing, by addition of an alkaline precipitating solution, the co-precipitation of the corresponding (Fe, Al and Co) hydroxides, which still contain iron in the ferrous form;

(B) oxidizing the hydroxide suspension prepared according to point (A) until divalent iron and trivalent iron are in a ratio to each other which ranges from 0.20 to 0.50;

(C) operating an alkaline doping with a potassium compound and heating in an inert atmosphere up to above 850° C.

20 Claims, 2 Drawing Sheets

PROCESS FOR PRODUCING THE PRECURSOR OF A PRECIPITATED CATALYST FOR THE AMMONIA SYNTHESIS

The present invention relates to a process for producing the precursor of a precipitated catalyst for the synthesis of ammonia, based on iron, aluminum, cobalt and potassium oxides.

The catalysts for the synthesis of $NH_3$, based on iron oxides, are produced at present by melting of magnetite with minor amounts of other oxides ($Al_2O_3$, $K_2O$, etc.), followed by solidification and by grinding to the desired size. European patent 174,078 has recently disclosed that it is possible to prepare catalysts endowed with a higher activity if the Fe, Al and Co hydroxides are co-precipitated from a solution which contains iron as ferric ion, by addition of a precipitating alkaline solution, and subsequently the resulting precursor, after doping with K, is reduced in a mildly reducing atmosphere. According to a later European patent application (EP-A-200,315) the co-precipitated hydroxides are calcined in air and then doped with K. Such catalysts are classified as catalysts of the "precipitated" (or "co-precipitated") type, in contrast with the conventional catalyst of the "melted" type.

Figure 1:
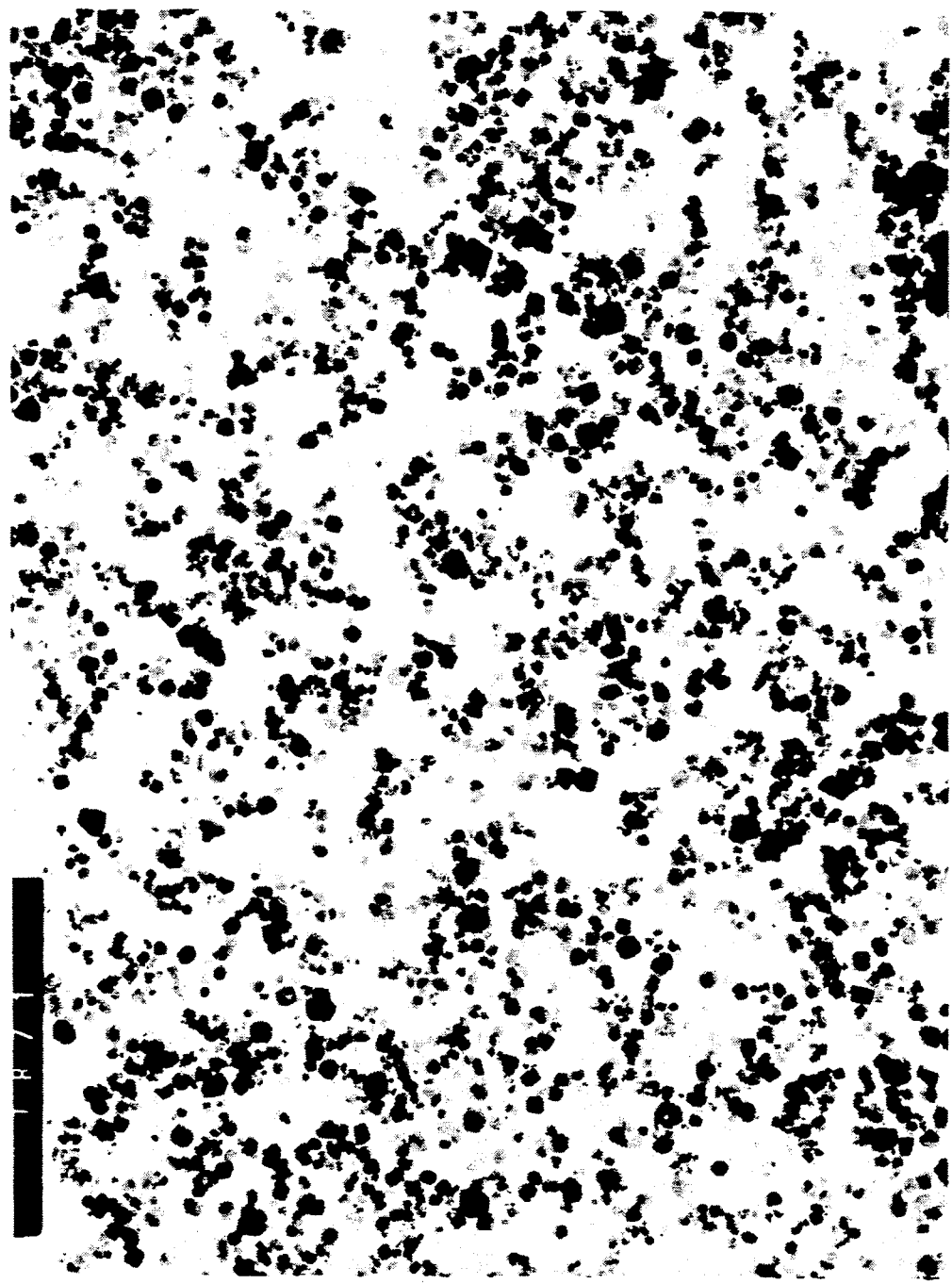
FIG. 1 represents the particle size distribution of the invention.

The Applicant has now found a new method for preparing said precursor and has observed that the new method leads to unexpectedly higher yields when the consequent catalyst is utilized for the ammonia synthesis; other advantages are elucidated later on herein.

In its broadest aspect, the invention relates to a process for producing the precursor of a "precipitated" catalyst for the ammonia synthesis, based on iron, aluminum, cobalt and potassium oxides, containing from 0.5 to 5% by moles of Al, from 2 to 20% by moles of Co and from 0.4 to 1% by weight of $K_2O$, characterized by the steps of:

A) preparing an aqueous solution of water-soluble compounds of Fe, Al and Co (potassium excluded), adding iron as a water-soluble ferrous salt of an organic acid, preferably selected among the aliphatic carboxylic acids having from 1 to 6 carbon atoms, and—while operating in an inert atmosphere—causing (by addition of a precipitating alkaline solution) the co-precipitation of the corresponding hydroxides (of Fe, Al and Co), still containing iron in a reduced (ferrous) form;

B) oxidizing, with $H_2O_2$, $O_2$, air or another oxygen-containing gas, the hydroxide suspension prepared according to point A), until the divalent iron and the trivalent iron (consequent to oxidation) are in a ratio ranging from 0.20 to 0.50.

C) operating an alkaline doping with a potassium compound and subsequently heating, in an inert atmosphere, to a temperature equal to or higher than 850° C. and preferably ranging from 900° to 1050° C.

By the above process it is possible to obtain an excellent precursor characterized in that:

i) the granule density ranges from 3.0 to 4.5 g/cm and the surface area (BET) is less than 10 $m^2/g$ and preferably ranges from 4 to 8 $m^2/g$, the pore volume being from 0.05 to 0.20 $cm^3/g$;

ii) at least 50% of the porosity consists of pores having an average radius ranging from 15 to 30 nanometers, the compression strength being equal to or higher than 300 $kg/cm^2$ and preferably being equal to 370 $kg/cm^2$.

Said compression strength is the strength to axial compression, determined on little plates having a diameter of about 10 mm and a height of about 4 mm, according to standard ASTM-D-4179/82 (employing a punch feed speed of 1 mm/minute); the compression strength of the plates prepared according to the prior art, conversely, is (generally) lower than 200 $kg/cm^2$ and sometimes also lower than 50 $kg/cm^2$.

The catalyst obtained from this precursor (by reduction) has a high catalytic activity; in fact, kinetic constants (according to Temkin; the definitions are given later on in the specification) equal to or higher than 230 and preferably equal to 280 have been determined. After artificial aging, said constants remain above a value of 190 and preferably have a value equal to or higher than 240.

Figure 2:
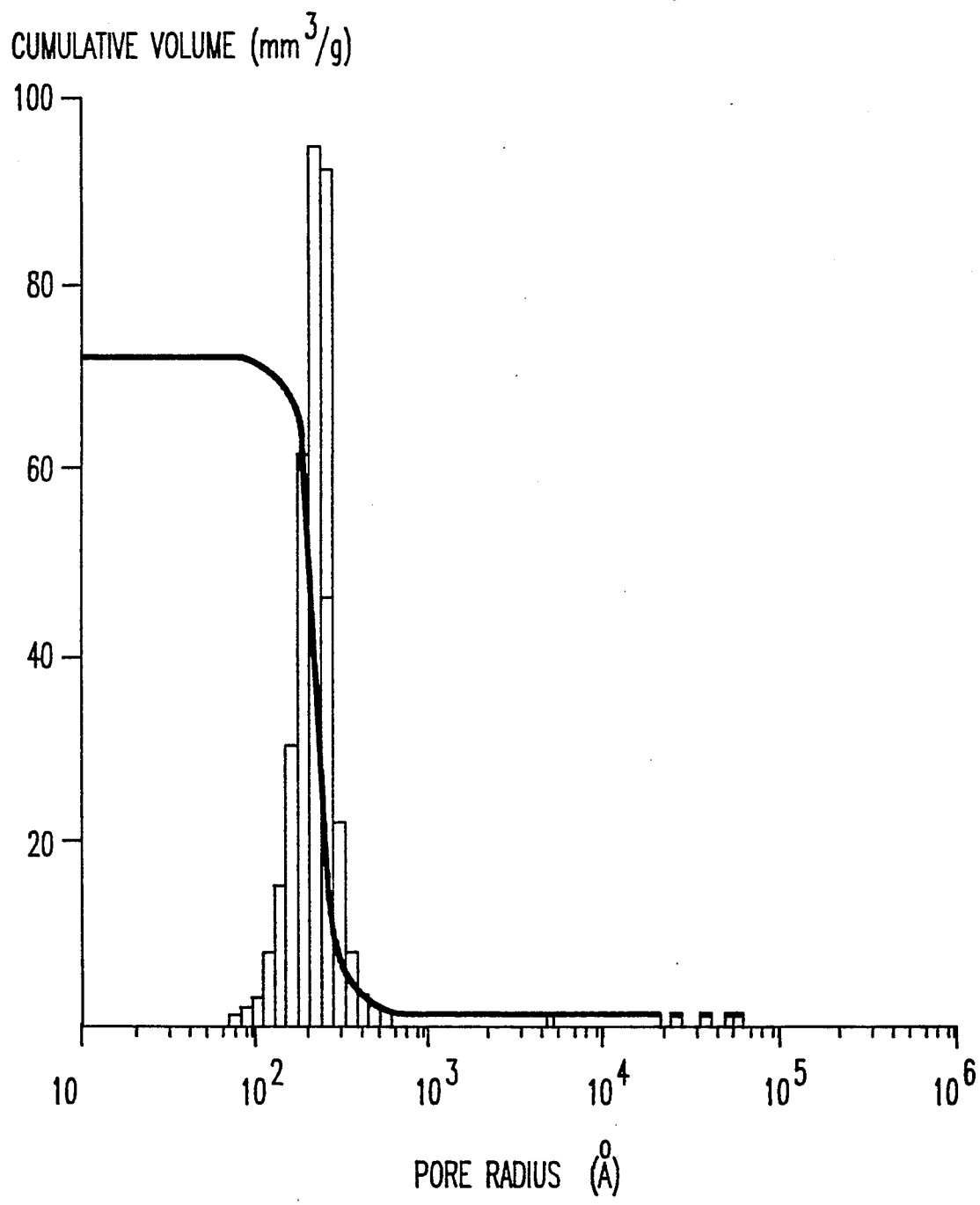
FIG. 2 represents the pore radius distribution of the invention.

The use of the ferrous salt of an organic acid in the preparation of the precursor surprisingly affects the properties of the catalyst derived from said precursor. For example, the Applicant has observed that the use of $FeCl_2$, in place of the organic salt, involves serious problems concerning the precursor reproduceability (in terms of chlorine and of potassium content) and a low catalytic activity. The co-precipitate obtained according to the invention exhibits furthermore the following advantages as compared with the co-precipitates from ferric salts, described in the prior art:

it has the crystalline structure of magnetite instead of the amorphous structure of the ferric hydroxides, what facilitates a few process steps such as filtration and the washings which are necessary to separate the solid product from the mother liquors (and to remove the soluble salts);

it consists of particles having a spheroidal morphology with a narrow particle size distribution (from about 0.03 to about 0.10 micrometers; see FIG. 1); by consequence the powders, compacted and sinterized, exhibit a narrow and reproduceable distribution of the pore radius (see FIG. 2; the Applicant has observed that said characteristic exerts a very favorable influence on the catalytic synthesis of ammonia);

the density of the precursor prepared by the new method is higher than the one of the precursors prepared according to the conventional technique based on the co-precipitation from ferric salts; that involves not only a higher mechanical strength (to compression and to abrasion), but also the possibility of charging a greater catalyst mass, the catalytic bed volume being equal, thereby permitting a better utilization of the plants.

Very satisfactory results are achieved when said ferrous salt is selected from acetate, lactate, gluconate (and mixtures thereof) and when furthermore:

the concentration of ferrous ion ($Fe^{2+}$), in the starting solution, ranges from 0.2 to 1.2 moles per liter of solution, the pH of said starting solution being from 4.5 to 5.5;

the precipitating alkaline solution contains sodium, potassium hydroxide and/or carbonate, or mixtures thereof;

the oxidation temperature ranges from 50° to 100° C., preferably from 80° to 95° C., and the pH, after addition of the precipitating alkaline solution, ranges from 6.5 to 9.5 (preferably from 8 to 9) and is maintained constant, by further additions of alkaline solution, both during heating of the hydroxides suspension and during oxidation, the oxidation time (as a function of the temperature, of the pH, of the concentration of $Fe^{2+}$ ions and of the oxidizing gas flow rate) generally ranging from 3 to 6 hours;

the precipitate obtained after oxidation, separated from the mother liquors by filtration (or centrifugation, or magnetic separation) and washed with water in order to remove the soluble salts, is dried at a temperature from 50° to 100° C., in an inert gas flow or under vacuum, in order not to alter the $Fe^{2+}/Fe^{3+}$ ratio;

the starting solution contains a water-soluble aluminum salt, for example chloride or lactate, in such amounts that the Al proportion in the finished catalyst ranges from 2.5 to 5% by moles. As water-soluble Al salts it is possible to use also the chlorides; in fact, since the aluminum mol-% in the catalyst does not exceed 5%, the Cl amount introduced with such metal does not involve so negative effects as the ones mentioned in relation to ferrous chloride;

there are used, as water-soluble Co salts, the divalent cobalt salts such as, for example, cobaltous chloride and acetate; for Co contents equal to or higher than 3% (by moles) it is preferable to use the acetate; the starting solution contains said water-soluble cobalt salt, for example acetate, in such amounts that the cobalt proportion in the finished catalyst ranges from 2 to 20% by moles (preferably from 3 to 15%);

for the alkaline doping, use is made of potassium in the form of hydroxide or, preferably, of carbonate; as an alternative, Rb or Cs (in the form of carbonates) can take the place of potassium, with equivalent results; the alkaline doping is carried out by kneading the powder, dried and previously disaggregated by mild grinding, with an aqueous solution of potassium hydroxide or carbonate. The alkaline solution concentration is suitably selected in order that the mix may assume the best consistence for obtaining a homogeneous distribution of the alkaline element in the precursor; usually it is operated with solutions containing from 0.25 to 0.30 moles/liter of K; the potassium amount to be utilized for the doping is such that the finished catalyst will contain from 0.4 to 1.0% by weight of $K_2O$;

drying of the precursor, doped with K, is carried out at a temperature from 50° to 100° C., in an inert gas flow or under vacuum, in order not to alter the $Fe^{2+}/Fe^{3+}$ ratio.

The drying step involves a certain aggregation of the powder and the presence of aggregates, even if they are "weak", may be undesirable in the subsequent shaping steps. A mild grinding, optionally followed or replaced by screening, for example below 210 microns (70 Tyler mesh), eliminates this drawback, so that the powder is fit for being shaped, i.e. compacted to the geometric shape, which is considered as the most suitable. Shaping can be carried out by means of any conventional technique, for example dry pressing, extrusion or pelletizing. The pressed powders do not possess sufficient characteristics of mechanical strength and abrasion resistance, but when they are subjected to a heat treatment, they undergo a sintering process which is more or less intense as a function of the baking temperature and time, and as a consequence of said sintering, the macroporosity of the pressed powder, which is responsible for the mechanical brittleness, is replaced by a meso-porosity, with simultaneous increase in density and mechanical strength of the sintered body. By accurately adjusting the heat-treatment conditions it is possible to accurately modulate the surface area in the best mode (from 4 to 8 $m^2/g$), thereby obtaining surprisingly better results in comparison both with the melted precursors (area: lower than 1 $m^2/g$) and with the precipitated precursors of the prior art (area: higher than 20 $m^2/g$). The heat treatment is carried out in an inert gas environment, preferably consisting of $N_2$, Ar or mixtures thereof, at temperatures ranging from 850° to 1050° C., preferably from 900° to 1000° C. and for times from 1 to 3 hours. Heat treatments in a reducing atmosphere, with CO/CO mixtures, did not provide satisfactory results. As a consequence of the heat treatment, the precursors prepared according to the new method develop a meso-porosity characterized by a very narrow distribution of the pore sizes (see FIG. 2); that involves not only a better me chemical strength, but also and unexpectedly a higher catalytic activity. In particular the best results, in terms of catalytic activity, are achieved when at least 50% of the porosity consists of pores having an average radius from 15 to 30 nanometers.

The following examples are given for merely illustrative purposes and do not limit the scope of the invention.

EXAMPLE 1 (CATALYST CONTAINING 6% BY MOLS OF COBALT)

Part (A) (Preparation of ferrous acetate)

51.6 g of Fe in powder were dissolved in 136 g of glacial acetic acid diluted with 700 $cm^3$ of $H_2O$; this operation was conducted in a $N_2$ atmosphere, under stirring, maintaining the temperature at about 100° C. for 5 hours. The solution, green colored and thoroughly limpid, was cooled to room temperature and maintained in a $N_2$ atmosphere until the use.

Part (B) (Co-precipitation and oxidation)

15.42 g of $Co(CH_3COO)_2.4H_2O$ and 11.42 g of $AlCl_3.6H_2O$ were dissolved in the ferrous acetate solution prepared in Part (A), maintained under stirring and in a $N_2$ flow; the resulting solution was brought to a pH=9 by gradual addition of a 5 M aqueous solution of NaOH, consuming about 550 $cm^3$ thereof. The temperature was then brought to 90° C., maintaining the pH constant by further addition of the 5 M NaOH solution. After having stopped the $N_2$ flow, air (50 litres/h) began to be blown into the hydrated oxides suspension, thus starting the oxidation step. Also during this step the pH (which tends to decrease) was maintained constant (always with NaOH) at a value of about 9. The oxidation trend was followed by reading the redox potential values of the suspension (starting value=about −780 mV; final value=about −250 mV); the oxidation reaction time was of about 4 hours. Precipitation and oxidation were carried out in a 3-litre glass flask equipped with teflon stirrer, heating jacket, dropping funnel, reflux cooler, thermometer, plunging pipe, sparger for the air blowing and electrodes for measuring the pH and the redox potential. The precipitate (black magnetic powder) was washed three times by decantation, then it was filtered on a Buckner filter and twice washed with 200 $cm^3$ of deionized water. The cake was then dried in an oven at 70° C. under vacuum, thus obtaining 75 g of a powder, which was disaggregated by grinding in a mortar. The powder wa subjected to analyses, which revealed that the mol-% of Co and Al, i.e. the values:

$$\frac{\text{Co atoms}}{\text{(Co + Al + Fe) atoms}} \times 100 \text{ and}$$

$$\frac{\text{Al atoms}}{\text{(Co + Al + Fe) atoms}} \times 100$$

were fully in accordance with the ones which had been calculated on the basis of the utilized reagents. In particular there were found: Co=6.0%; Al=4.5%. The $Fe^{2+}/Fe^{3+}$ ratio was equal to about 0.27:1.

Part (C) Alkaline doping (with KOH) and pelletizing

The powder obtained according to Part (B) was kneaded, in a porcelain capsule, with an aqueous solution containing 15.12 g/liter of KOH (55 cm$^3$ of solution per 100 g of powder), thereby obtaining a doped product (precursor) containing 0.7% by weight of $K_2O$. 1.5 g of precursor in powder were pressed, at 800 bar, for 2 minutes, in a cylindrical mold having an inside diameter of 12 mm; no lubricants were used in order to prevent any pollution of the catalyst pellets.

Part (D) Heat treatment and final grinding

The pellets (12×5 mm) were charged into an alumina nacelle, which was introduced into a quartz tube, electrically heated to 1000° C. by means of a tubular muffle, in an inert atmosphere (argon), in order to prevent a further increase in the iron oxidation degree. Then the product was cooled, keeping it in an inert atmosphere, down to room temperature. The values of the surface area and of the pore volume were 4.7 m$^2$/g and 0.076 cm$^3$/g, respectively; the porosity having an average radius of the pores ranging from 15 to 30 nanometers wa about 60% of the total porosity (total volume of the pores); the pel lets, partially sintered (particle density=3.25 g/cm$^3$), were crushed in an agate mortar and screened; the fraction between 297 and 500 micrometers (35-50 Tyler mesh) was utilized for the ammonia synthesis tests.

Part (E) Preparation of the precursor sample and reduction of same to catalyst 2.485 g of ground precursor were poured into a graduated cylinder having a 5 cm$^3$ volume (inside diameter=6 mm). After settling of the catalytic mass, by slightly hitting the cylinder wall, the volume measure was read (1.29 cm$^3$) and an inert dilunet was added, which consisted of alumina having the same particle size, in such amount as to obtain 5 cm$^3$ of mixture. The mixture, after having been taken out from the cylinder, was manually homogenized in a testing reactor. The precursor was then reduced to catalyst in a nitrogen and hydrogen flow ($H_2:N_2=3:1$ by moles; flow rate=50 Nl/h) at a pressure of 6 bar. The temperature was brought to 300° C. in 90 minutes and then it was caused to sink by 50° C./h down to 480° C.; the pressure was raised to 50 bar and the final conditions were maintained constant for 16 hours. The precursor reduction and the subsequent catalytic activity tests were carried out in a tubular microreactor made of AISI 316, equipped with a thermocouple and heated in a vertical electric muffle, fed with hydrogen and nitrogen (in a molar ratio of 3:1) and having an inside diameter of 11 mm.

Part (F) Ammonia Synthesis Tests (Before and After Aging)

On conclusion of the reduction operations illustrated in Part (E), the temperature was lowered to 450° C., keeping constant both pressure and flowrate, and then (maintaining constant both temperature and pressure) the flow rate of the gaseous mixture ($3H_2+N_2$) was varied in the range from 6 to 300 N litre/hour. The gas leaving the reactor was made to flow through a titrated solution of sulphuric acid, in order to determine the $NH_3$ concentration. The catalyst activity in the $NH_3$ synthesis was expressed by means of the kinetic constant ($K_2$) of the Temkin equation, in the version described by D.C. Dyson and J.M. Simon (I.E.C. FUNDAMENTALS; vol. 7; No. 4; November 1968; page 605). Said equation can be written as follows:

$$r = K_2 [K_{eq}^2 a_N(a_H^3/a_A^2)^\alpha - (a_A^2/a_H^3)^{(1-\alpha)}]$$

where: $a_N$, $a_H$ and $a_A$ are the activities of nitrogen, of hydrogen and of amonia; $K_{eq}$ is the equilibrium constant; $K_2$ is the searched kinetic constant and r is the reaction rate that can be expressed as $$\frac{\text{Kmoles/h of } NH_3}{m^3 \text{ of apparent volume of pure catalyst}}$$

and is experimentally determined. To coefficient ($\alpha$) of the Temkin equation, a value of 0.75 was attributed. In the present case, the apparent volume was of 1.29 cm$^3$ ($1.29 \times 10^{-6}$ m$^3$).

After having determined the catalytic activity (at 450° C.) in the manner described above, the catalyst was treated at 550° C., for 6 hours, with the same mixture (hydrogen+nitrogen), simulating an aging process; then the measurement of the catalytic activity (at 450° C.) was repeated and the kinetic constant ($K_2$) after aging was determined. The results of the activity tests, before and after aging, are shown in Table 1 along with the most important physical data.

Example 2—Comparative test (co-precipitation from $FeCl_3+FeCl_2$; Co=6% by mols)

Example 1 was repeated, maintaining constant the atomic percentages of Co and Al (i.e. the catalyst composition), but varying the operative modalities according to the teaching of patent EP 174,078. In particular, the ferrous acetate solution was replaced by a ferrous chloride and ferric chloride solution, in a molar ratio of 2:1, and after the co-precipitation, carried out in an inert atmosphere, the ferrous salt oxidation step was omitted.

The test was conducted according to the following modalities, using the apparatus described in the first of the examples.

58.2 g of hydrated $FeCl_2$, corresponding to 0.289 moles of $Fe^{2+}$, were dissolved in one liter of water in a nitrogen flow. In the limpid ferrous salt solution there were dissolved 161.1 g of $FeCl_3.6H_2O$ (0.596 moles of $Fe^{3+}$), 14.94 g of $Co(CH_3COO)_2.4H_2O$ (0.06 moles) and 11.1 g of $AlCl_3.6H_2O$ (0.046 moles). Maintaining the nitrogen flow, the temperature was brought to 90° C.; then the pH was brought to 9 by dropping a 5M NaOH solution, consuming 565 cm$^3$ thereof. On conclusion of the NaOH addition, the resulting powder suspension (black and magnetic) was allowed to cool down to room temperature, always in a nitrogen flow; the subsequent steps were conducted in like manner as in example 1. The analysis carried out on the powder revealed a O/Fe ratio close to 1.40, higher than the expected ratio of 1.33. The catalytic activity test was conducted as in example 1, charging 1.29 cm$^3$ of catalyst into the reactor. The low catalytic activity of the catalyst is indicated in Table 1.

Example 3 (precursor containing 6 % by mols of cobalt and 3.5% by mols of aluminum)

Example 1 was repeated, varying quantitatively the starting composition in order to have in the precursor 6.0% by mols of Co and 3.5% by moles of Al. The precipitate was subjected, after washing and filtering, to TEM analysis (transmission electronic microscopy),- which revealed that the powder consisted of spheroidal particles having an average size of about 0.04 microns. The alkaline doping was carried out by an aqueous solution containing 18.5 g/l of $K_2CO_3$, using 56 cm$^3$ thereof for 100 g of dried powder, so that the $K_2O$ content of the precursor was equal to 0.7% by weight. After pelletizing and heat treatment as in example 1, the $Fe^{2+}/Fe^{3+}$ ratio was equal to 0.32. The values of the surface area and of the pore volume were 5.7 m$^2$/g and 0.064 cm$^3$/g, respectively; the porosity with pore radius ranging from 15 to 30 nanometers was about 80% of the total porosity (total volume of the pores). The catalytic activity determination, before and after aging, was carried out using 1.29 cm$^3$ of catalyst. The results, along with the most significant physical data are reported on Table 2.

Example 4 (Catalyst containing 3% by moles of cobalt and 4.6% by moles of aluminum)

Example 1 was repeated, but the starting composition was quantitatively varied so as to have 3.0% by moles of Co and 4.6% by moles of Al in the precursor. The precipitate was subjected, after washing and filtering, to TEM analysis (transmission electronic microscopy),- which revealed that the powder consisted of spheroidal particles having an average size of about 0.05 micrometer. The alkaline doping as well as the subsequent pelletizing and heat treatment operations were carried out as is described in example 1. The values of the surface area and of the pore volume were 5.0 m$^2$g and 0.078 cm$^3$/g, respectively; the porosity with a pore radius ranging from 15 to 30 nanometers was about 60% of the total porosity, while the $Fe^{2+}/Fe^{3+}$ ratio was equal to 0.37. The catalytic activity determination was carried out using 1.25 cm$^3$ of catalyst. Data and results are incited in Table 2.

TABLE 1

|  | EXAMPLE | |
|---|---|---|
|  | 1 | 2(*) |
| PHYSICAL DATA: | | |
| Particle density (g/cm$^3$) | 3.88 | 2.94 |
| Surface area (m$^2$/g) | 4.7 | 1.0 |
| Pore volume (cm$^3$/g) | 0.076 | 0.141 |
| Fraction of the pore volume with radius from 15 to 30 nm | 60% | 15% |
| $Fe^{2+}$ : $Fe^{3+}$ | 0.27 | 0.20 |
| Compression strength (kg/cm$^2$) | 380 | — |
| KINETIC CONSTANT (K$_2$): | | |
| starting | 252 | 21.5 |
| after ageing | 200 | — |

(*) Comparative test.

TABLE 2

|  | EXAMPLE | |
|---|---|---|
|  | 3 | 4 |
| PHYSICAL DATA: | | |
| Particle density (g/cm$^3$) | 3.55 | 4.09 |
| surface area (m$^2$/g) | 5.7 | 5.0 |
| Pore volume (cm$^3$/g) | 0.064 | 0.078 |
| Fraction of the pore volume with radius from 15 to 30 nm | 80% | n.d. |
| $Fe^{2+}$ : $Fe^{3+}$ | 0.32 | 0.37 |
| Compression strength (kg/cm$^2$) | 370 | 395 |
| KINETIC CONSTANT (K$_2$): | | |
| starting | 286 | 233 |
| after ageing | 242 | — |

What we claim is:

1. A process for producing a precursor of a precipitated catalyst for amonia synthesis, based on iron, aluminum, cobalt and potassium oxides, containing rom 0.5 to 5% by moles of Al, from 2 to 20% by moles of Co and from 0.4 to 1% by weight of $K_2O$, comprising the steps of:

(A) preparing an aqueous solution of water-soluble compounds of Fe, Al and Co (potassium excluded), adding iron as a water-soluble ferrous salt of an organic acid, and adding, while operating in an inert atmosphere, a precipitating alkaline solution, thereby causing the co-precipitation of the Fe, Al and Co hydroxides, which still contain iron in the ferrous form;

(B) oxidizing, with $H_2O_2$, $O_2$, air or another oxygen-containing gas, the hydroxide suspension prepared according to (A), until the divalent iron and the trivalent iron are in a ratio to each other ($Fe^{2+}$/$Fe^{3+}$) ranging from 0.20 to 0.50; and (C) operating an alkaline doping with a potassium compound and subsequently heating, in an inert atmosphere, to a temperature equal to or higher than 850° C.

2. The process according to claim 1, wherein said water-soluble ferrous salt is selected from ferrous acetate, ferrous lactate, ferrous gluconate and mixtures thereof.

3. The process according to claim 1 or 2, wherein the concentration of said water-soluble ferrous salt ($Fe^{2+}$) in the starting solution ranges from 0.2 to 1.2 moles per liter of solution and the pH of said starting solution ranges from 4.5 to 5.5.

4. The process according to claim 1, wherein the precipitating alkaline solution contains sodium hydroxide, sodium carbonate, potassium hydroxide, potassium carbonate or mixtures thereof.

5. The process according to claim 1, wherein the oxidation temperature ranges from 50° to 100° C. and that:

a) the pH, after addition of the precipitating alkaline solution, ranges from 6.5 to 9.5 and is maintained constant, by further additions of alkaline solution, both during heating of the hydroxide suspension and during the subsequent oxidation;

b) the precipitate obtained after oxidation, separated from the mother liquors by at least one process selected from the group consisting of filtration, centrifugation, and magnetic separation and washed with water, is dried at a temperature from 50° to 100° C., in an inert gas flow or under vacuum.

6. The process according to claim 1, wherein the starting solution contains a water-soluble aluminum salt, such as chloride, lactate or mixtures thereof, in such amounts that the Al proportion in the finished catalyst ranges from 2.5 to 5% by moles.

7. The process according to claim 1, wherein, as water-soluble Co compounds, there are used divalent cobalt salts, such as cobalt (II) chloride and cobalt (II) acetate.

8. The process according to claim 7, wherein the solution contains a water-soluble Co salt in such amounts that the Co proportion in the finished catalyst ranges from 3 to 15% by moles.

9. The process according to claim 1, wherein said potassium compound for the alkaline doping is potassium hydroxide or potassium carbonate.

10. The process according to claim 1, wherein the alkaline doping is carried out by kneading the product of (B) (after disaggregated by means of grinding) with an aqueous solution of potassium hydroxide or carbonate, containing from 0.25 to 0.30 moles of K per liter.

11. The process according to claim 1, wherein the precursor, after having been doped with aK, is dried at a temperature from 50° to 100° C., in an inert gas flow or under vacuum, and then is subjected to grinding, optionally flowed or replaced by screening.

12. The process according to claim 10 or 11, wherein the precursor is heated in an inert gaseous medium, at temperatures from 850° to 1050° C.

13. The process according to claim 7, wherein, if the Co content is 3% by moles or greater, cobalt (II) acetate is employed.

14. The process according to claim 11, wherein said screening employs 670 tyler mesh resulting in particles smaller than 210 microns.

15. The process according to claim 12, wherein the inert gaseous medium comprises nitrogen, argon, or mixtures thereof.

16. The process according to claim 12, wherein the precursor is heated at temperatures from 900° to 1,000° C.

17. The process according to claim 1, wherein said organic acid of said water-soluble ferrous salt of an organic acid is selected from aliphatic carboxylic acids having from 1 to 6 carbon atoms.

18. The process according to claim 1, wherein said heating in an inert atmosphere is in a temperature range from 900° to 1050° C.

19. The process according to claim 5, wherein the oxidation temperature ranges from 80° to 95° C.

20. The process according to claim 5, wherein the pH ranges from 8 to 9.

* * * * *

UNITED STATES PATENT AND TRADEMARK OFFICE
CERTIFICATE OF CORRECTION

PATENT NO. : 5,221,657
DATED : JUNE 22, 1993
INVENTOR(S) : FRANCO MONTINO ET AL

It is certified that error appears in the above-indentified patent and that said Letters Patent is hereby corrected as shown below:

Column 6, line 5, "(E()" should read --(E)--.

Column 8, line 18, "amonia" should read --ammonia--;
line 19, "rom" should read --from--.

Column 9, line 19, "disaggregated" should read --disaggregation--.
line 23, "aK" should read --K--.

Column 10, line 8, "670 tyler" should read --70 Tyler--.

Signed and Sealed this

Thirty-first Day of May, 1994

Attest:

BRUCE LEHMAN

Attesting Officer                Commissioner of Patents and Trademarks